United States Patent [19]

Jungers et al.

[11] 4,142,342
[45] Mar. 6, 1979

[54] JOINT AND METHOD FOR CONNECTING STRUCTURAL MEMBERS

[75] Inventors: James W. Jungers, Arlington; Edwin R. Hoyt, Everett, both of Wash.

[73] Assignee: Pioneer Manufacturing, Inc., Arlington, Wash.

[21] Appl. No.: 809,912

[22] Filed: Jun. 24, 1977

Related U.S. Application Data

[62] Division of Ser. No. 682,566, May 3, 1976, Pat. No. 4,052,832.

[51] Int. Cl.² .............................................. E04C 2/40
[52] U.S. Cl. ...................................... 52/585; 403/294
[58] Field of Search ............... 403/355, 358, 319, 292, 403/294, 298; 52/86, 585, 586

[56] References Cited

U.S. PATENT DOCUMENTS

| 674,752 | 5/1901 | Baker | 403/292 |
|---|---|---|---|
| 691,049 | 1/1902 | D'Espine | 403/294 |
| 1,000,395 | 8/1911 | Frost | 403/294 |
| 1,537,678 | 5/1925 | Jensen | 403/294 |
| 2,978,758 | 4/1961 | Dunn | 52/86 |
| 3,603,053 | 9/1971 | Van Loghem | 403/292 |

FOREIGN PATENT DOCUMENTS

| 637507 | 1/1928 | France | 403/292 |
|---|---|---|---|
| 990242 | 6/1951 | France | 52/585 |
| 390504 | 4/1965 | Switzerland | 52/238 |

OTHER PUBLICATIONS

French Addition 71,956 dated Oct. 5, 1959, 1st Add. of French 1,151,824.

Primary Examiner—James L. Ridgill, Jr.
Attorney, Agent, or Firm—Christensen, O'Connor, Johnson & Kindness

[57] ABSTRACT

Structural members, especially components of a modular building, are joined at longitudinally extending and abutting surfaces by a correspondingly elongate connector having a cross-shaped transverse section. Each such member surface is formed with a pair of intersecting saw-cut slots that extend lengthwise of the surface and have a V-shaped transverse section in which the apex of the V lies substantially at the surface and in which the legs of the V diverge inwardly into the member. The members are arranged with the apexes of their respective pairs of slots in mutually opposed registry to define a composite, transverse slot configuration that is the complement of the cross-shaped connector and the connector is inserted endwise into the slots with opposed pairs of connector legs interlocking with the opposed pairs of V-shaped slots, respectively, and is driven longitudinally into the joint. In order to follow the contour of a transversely curved joint, one embodiment of the connector is in the form of a flexible member that bends into a conforming curve as it is driven into the joint. For another special application, the connector is longitudinally segmented and takes the form of a plurality of end-to-end arranged, alternately crisscrossed chips, each chip having a flat, rectangular shape that is received within transversely aligned slots of opposite members. In still a further embodiment, the connector coats with a pair of mutually opposed elongate channels separately secured to the respective members, each in recessed relation to the abutment surface thereof and with the flanges of each channel being biased toward the center of the channel so as to interlock with one pair of legs of the connector.

3 Claims, 12 Drawing Figures

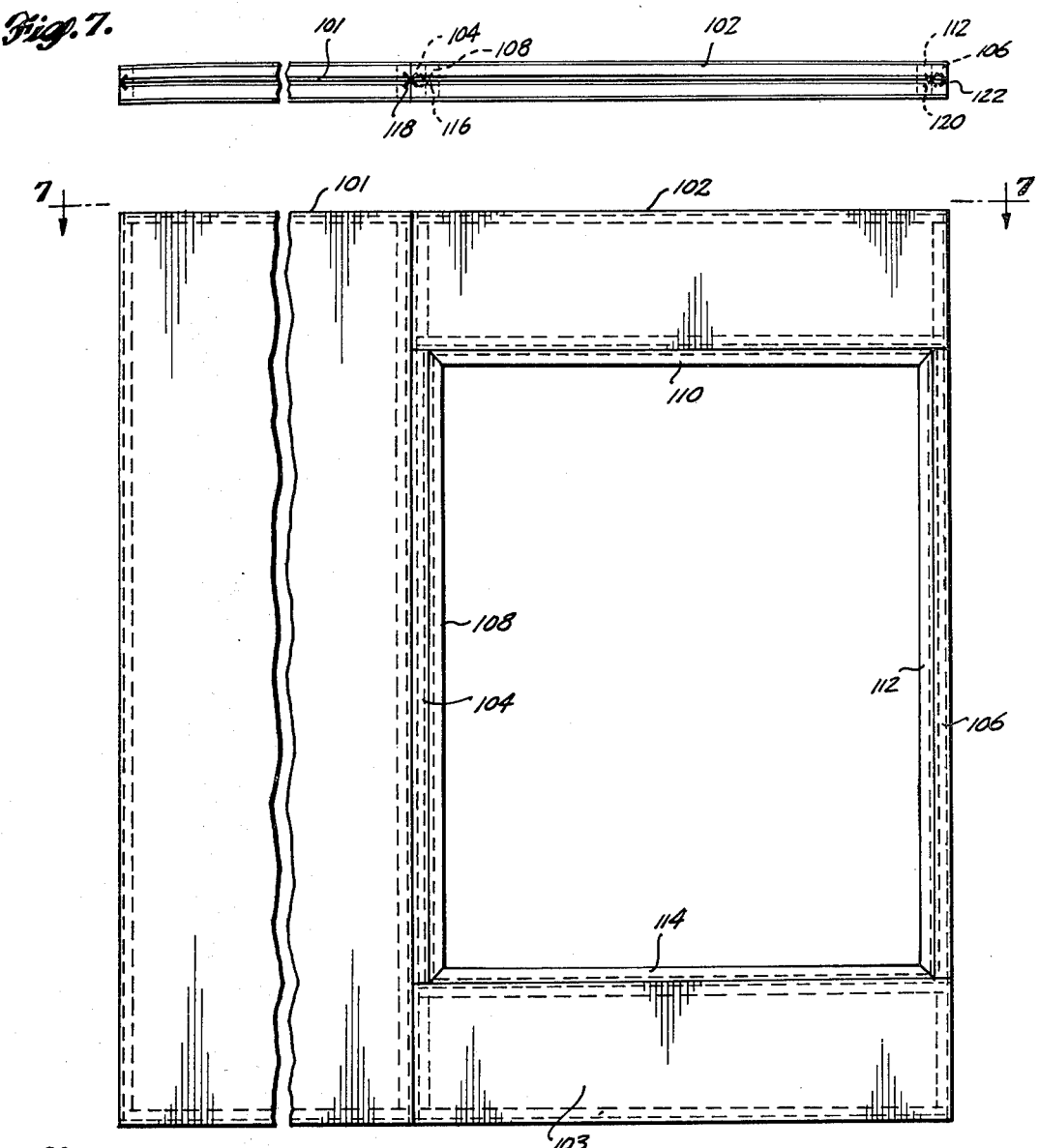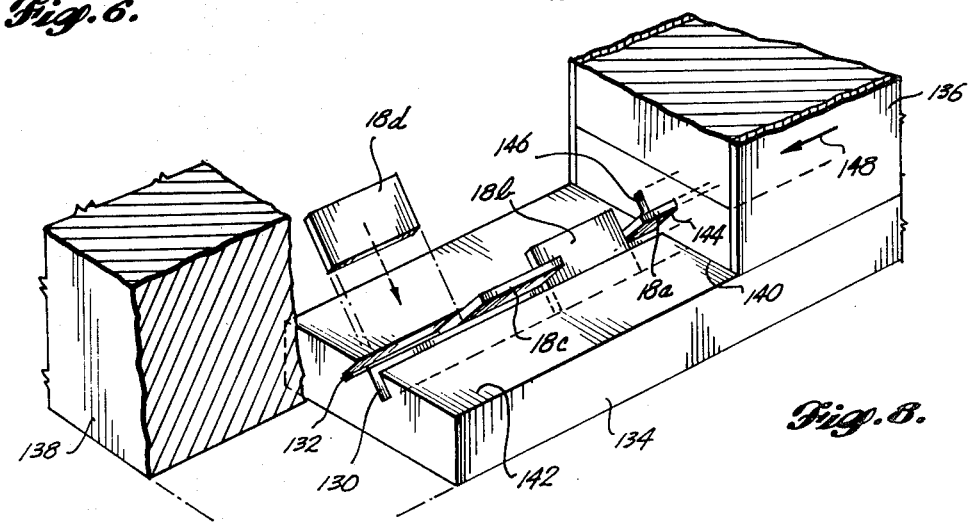

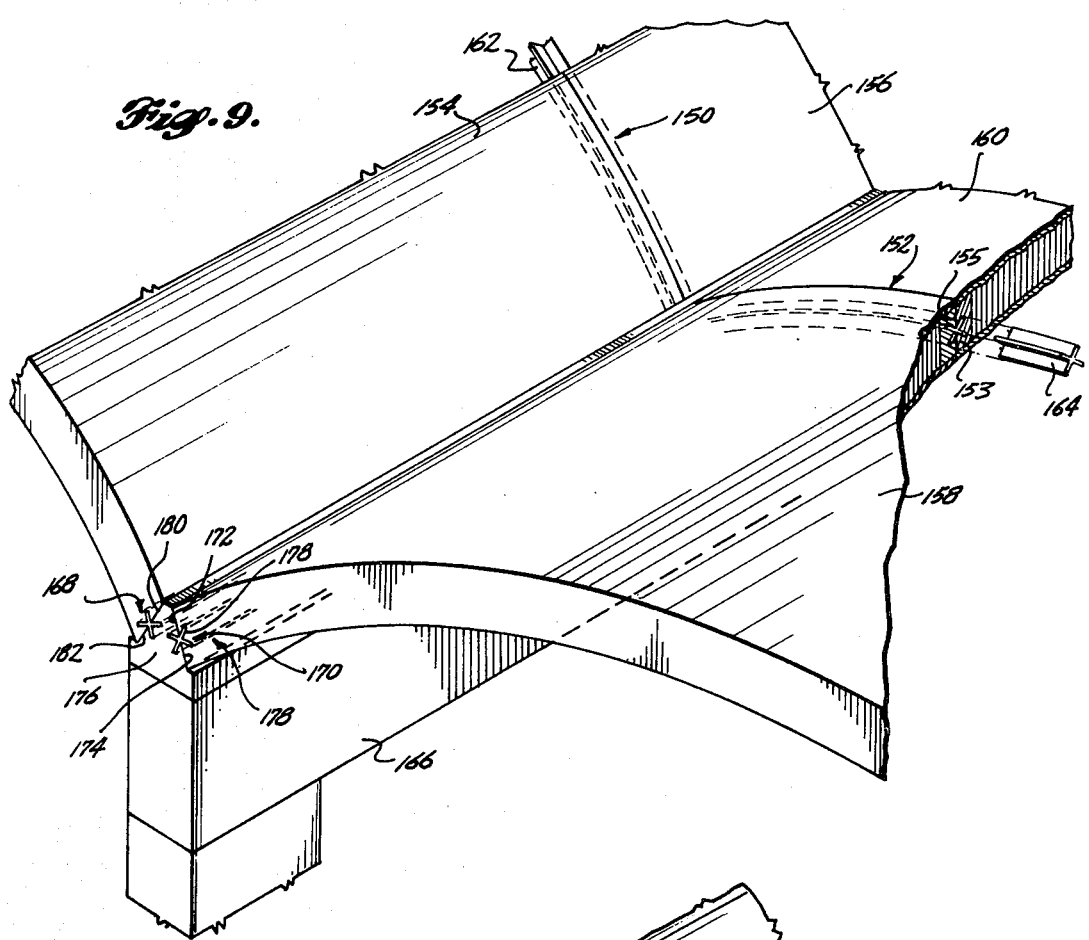
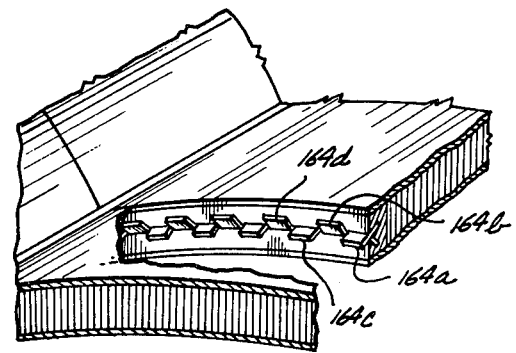
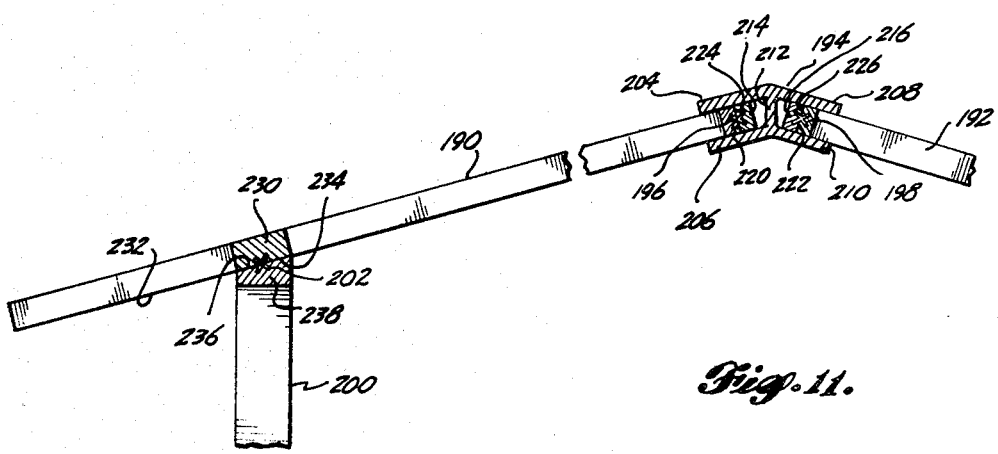

JOINT AND METHOD FOR CONNECTING STRUCTURAL MEMBERS

This is a divisional of application Ser. No. 682,566, filed May 3, 1976 now U.S. Pat. No. 4,052,832.

BACKGROUND OF THE INVENTION

The present invention relates to joint structures and methods for connecting abutting structural members, especially for light-weight honeycomb core panel members and the like used in modular building systems, but also for other structural members including those made of wood, metal, plastic, concrete, etc.

It is an object of the present invention to provide such a joint structure and associated method in which the members to be joined and portions of the joint itself can be easily prefabricated at a low per-unit cost, using readily available manufacturing equipment, and in which the joint can be quickly and easily assembled at a building site to produce a strong, reliable structural connection.

Another object of the present invention is to provide a joint structure and method of formation thereof for connecting structural members along longitudinally extending and abutting surfaces that are curved in a dimension transverse to the length of the joint.

SUMMARY OF THE PREFERRED EMBODIMENTS OF THE INVENTION

An elongate connector having a generally cross-shaped transverse section is used to connect structural members that abut along longitudinally extending surfaces. The members are each provided with means that extend longitudinally along the abutting surfaces for receiving and interlocking with the connector so as to hold the members in abutting relation.

In one embodiment of the joint, the means provided on each of the members comprises a pair of intersecting slots, such as formed by saw-cuts, that extend longitudinally of such surface, and inwardly therefrom to define in transverse section V-shaped slots in which the apex of the V lies generally at the surface of the member and the legs of the V diverge inwardly therefrom. At the apex of the V, the slots intersect to define a longitudinally extending opening that is common to both slots. The member surfaces are abutted and aligned so that the slot openings are in mutually opposed registry and in transverse section the V-shaped slots compositely form a cross configuration that is complemental to the transverse shape of the connector. The connector is inserted endwise into an open end of the registering pairs of V-shaped slots and is driven longitudinally into the joint. One pair of outwardly divergent legs of the connector interlock, in the transverse plane, with the V-shaped slots of one of the members, while the other, opposed pair of connector legs interlocks with the V-shaped slots of the remaining member, thus connecting and holding the member surfaces in abutment.

In one embodiment of the invention the connector is flexible for use in an elongate joint that is curved or otherwise deviates from a straight line, in which the connector, as it is inserted, bends to conform to the curvature of the joint.

In another embodiment, the connector is segmentally formed by a plurality of end-to-end arranged, flat, rectangular chips, that are alternately criss-crossed so as to be received in alternate sets of transversely aligned slots of opposite members.

These and further features, objects and advantages of the invention will become apparent to those skilled in the art from the following detailed description and appended drawings.

BRIEF DESCRIPTION OF THE DRAWINGS

FIG. 6 is an elevation view of an assembly of several structural panels and framing members arranged and connected together by means of the joint shown in FIGS. 1 and 2 to form a wall and window section of a modular building.

FIG. 7 is a top plan view of the assembly shown in FIG. 6 as seen from line 7—7 of FIG. 6.

FIG. 8 is an isometric view of an alternative embodiment of the joint shown in FIGS. 1 and 2, in which the connector, rather than being longitudinally continuous, is segmented and is formed by a plurality of end-to-end arranged, alternately criss-crossed, flat, rectangular chips.

FIG. 9 is an isometric view of an assembly of structural components, in which certain of the joints between such components extend along center-lines that are curved, and in which the connectors used for such joints are modified forms of the connector shown in FIGS. 1 and 2 above.

FIG. 10 is an isometric view similar to FIG. 9 but on a reduced scale, showing an alternative way of forming the curved joint of FIG. 9, using the segmented connector depicted in FIG. 8 above.

FIG. 11 is an elevation view of one end of an assembly that forms the roof of a building in which the structural members of the assembly are arranged and connected by joints formed in accordance with FIGS. 1 and 2.

DESCRIPTION OF THE PREFERRED EMBODIMENTS

Figure 1:
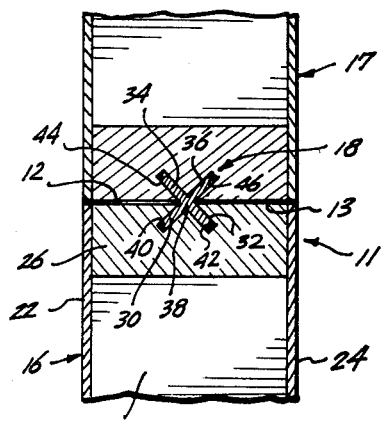
FIG. 1 is a transverse, sectional view of an elongate joint formed between two structural members in accordance with one embodiment of the present invention.
Figure 2:
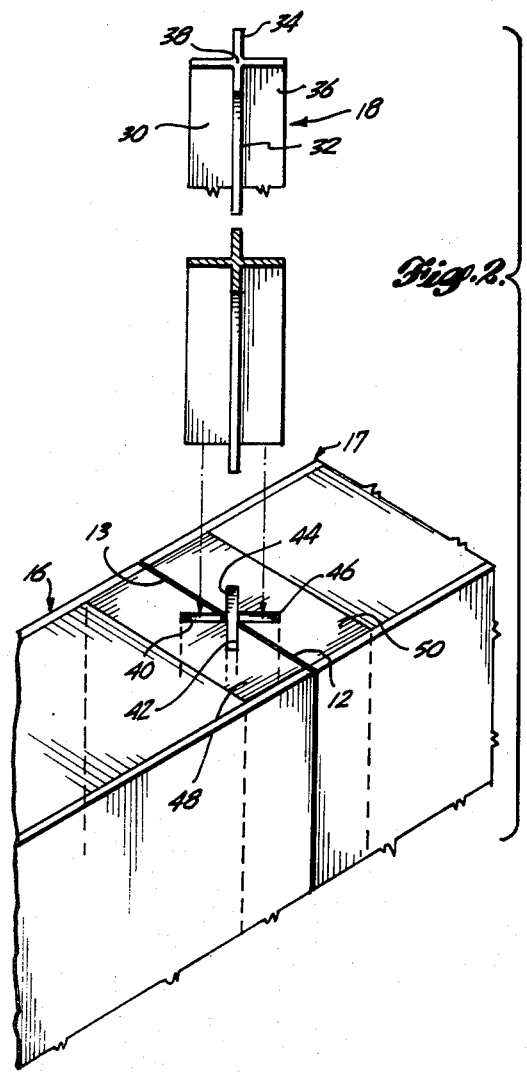
FIG. 2 is a partial, exploded view of the joint shown in FIG. 1, with a cross-shaped connector thereof removed from complementally shaped slots formed in the members at the abutting surfaces thereof.

With reference to FIGS. 1 and 2, one embodiment of the present invention is provided by a joint 11 formed between longitudinally extending and abutting planar edge surfaces 12 and 13 of panel members 16 and 17 in which joint 11 extends longitudinally with surfaces 12 and 13 and is at all points equidistant from the faces of the panel members. A correspondingly elongate connector 18 having a cross-shaped transverse section interlocks with slots formed in members 16 and 17 at the abutting surfaces 12 and 13 in which such slots have a composite shape in the transverse plane that is the complement of the cross-shaped connector. Preferably, and in this instance, members 16 and 17 are honeycomb-core panels of the type frequently used in modular building systems. Each panel, such as described with reference to panel 16, includes a central honeycomb core 20 of kraft paper or the like sandwiched between outer skins 22 and 24 of material such as aluminum, other sheet metal or waterproof bonded veneer, and an elongate edge insert 26 of rectangular cross section and of a material capable of being saw-cut to form the above-mentioned slots. In this embodiment insert 26 is of wood, and in particular high density resin impregnated particle board, however other materials can be used such as metal, plastic, concrete, etc. Core 20, skins 22 and 24 and insert 26 are all laminated together to form a unitary structural member.

Connector 18 in transverse section defines a cross including first and second pairs of adjacent legs 30, 32 and 34, 36 that diverge outwardly from a central juncture 38. In this instance the connector legs are symmetrical with respect to juncture 38 and form equal 90° dihedral angles with each other. Preferably, the connector is fabricated by extruding aluminum metal through a die that forms the cross-shaped section, however the manner of fabrication and the material are not critical and any number of materials may be used including metals, plastics, etc., selected to withstand the forces exerted on the connector in the particular structural environment in which it is used.

Coacting with connector 18 are first and second pairs of longitudinally extending slots 40, 42 and 44, 46 formed in members 16 and 17 by saw cuts into surfaces 12 and 13 of the wooden inserts, such insert 26 of member 16. On each surface the saw cuts intercept each other at a common longitudinal opening and diverge inwardly therefrom such that the transverse section of each pair of slots 40, 42 and 44, 46 defines a V-shape with the apex of each V lying substantially at the respective one of surfaces 12 and 13. By abutting and aligning surfaces 12 and 13 of members 16 and 17, the common openings at the apexes of the pairs of slots 40, 42 and 44, 46 may be arranged in mutually opposed registration so that the slots, in composite, form a transverse section that is complemental to the cross-shape of the connector 18. The slots are readily cut using a common circular saw, angled first in one direction to the surface of the member for cutting one slot and then angled in the other direction to cut the other slot. No special expensive slot cutting heads or equipment are required.

After slotting surfaces 12 and 13 of members 16 and 17 the joint 11 is assembled by abutting and aligning surfaces 12 and 13 as above and inserting member 18 endwise into the ends of the slots exposed at edge surfaces 48 and 50 (FIG. 2) of members 16 and 17, where such surfaces 48 and 50 lie transverse to the abutting surfaces 12 and 13. Alternatively, member 18 may be inserted with one pair of adjacent legs interlocking with the V-shaped slots of one of members 16 and 17, and the other of such members can be disposed to cause its V-shaped slots to interlock with the protruding legs of member 18 and thereafter slid into place to position edge surfaces 48 and 50 flush with each other.

The saw cuts forming slots 40, 42 and 44, 46 are disposed and dimensioned relative to connector 18 to form a snug interlocking fit with the connector legs so that each pair of connector legs is restrained against any transverse movement relative to the interlocking structural member. With the joint assembled and the connector legs thus interlocked with the respective members, a connection is established that is capable of withstanding any loading on the panels in any direction except along the length of the joint itself. In the completed building (or other structure), the panels that are represented here by members 16 and 17, will be arranged with other panels and other framing members to prevent the occurrence of large inter-member stresses oriented along the joint.

To rigidify the joint in the transverse plane and to strengthen the joint along its length, the connector 18 may be adhesively bonded to the interior surfaces of slots 40, 42 and 44, 46. However, such is not necessary and in many cases the joint is adequately maintained by providing a snug fit of the connector and the slots as described herein.

Figure 3:
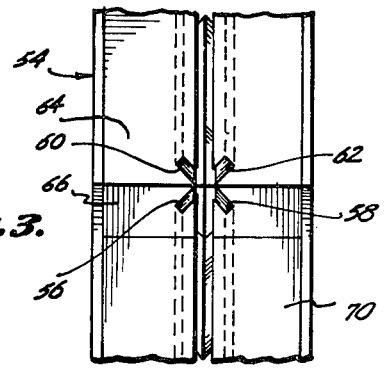
FIG. 3 is an isometric view of a corner of a panel member in which the edge surfaces of the member that intersect at such corner are each provided with a pair of V-shaped slots for edgewise connection to other members in accordance with the joint shown in FIGS. 1 and 2.
Figure 4:
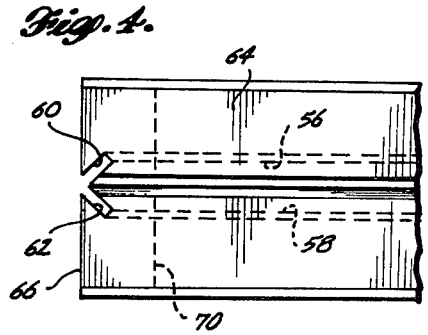
FIG. 4 is a top plan view of the panel member shown in FIG. 3.

FIGS. 3 and 4 illustrate the intersection of first and second pairs of V-shaped slots 56, 58 and 60, 62 provided on transversely disposed edge surfaces 64 and 66 defining a corner of panel member 54. Member 54, like members 16 and 17 includes wood inserts 68 and 70 that are arranged to form a butt joint at the corner of member 54, and that have exposed surfaces 64 and 66 into which the slots are cut. Slots 56, 58 and 60, 62 are extended along their respective surfaces 64 and 66 until such surfaces end at the corner of the panel leaving a region proximate the corner in which the slots cross paths. When member 54 is joined to other members at surfaces 64 and 66, one of the connectors associated with these respective joints is cut to a length that allows it to be received within its associated pair of V-shaped slots, such as slots 56, 58 on surface 64 so that the end of the connector is recessed inwardly of surface 66 so as to not obstruct the cooperation of slots 60, 62 with their associated connector.

Figure 5:
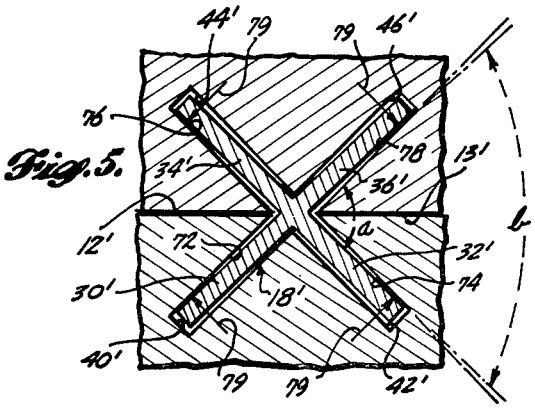
FIG. 5 is a transverse sectional view, similar to FIG. 1, illustrating a preferred interference fit that is provided between the cross-shaped connector and the opposed V-shaped slots.

In one preferred form of the invention as shown in FIG. 5, the V-shaped slots 40', 42' and 44', 46' of the members and connector 18' are relatively dimensioned and arranged so that each pair of legs 30, 32' and 34', 36' form an interference fit with the interior slot surfaces 72, 74 and 76, 78 that face away from the plane of abutment of member surfaces 12' and 13'. This interference fit causes the legs of a rigid connector 18' to exert a force on each of surfaces 72, 74 and 76, 78 in the directions depicted by arrows 79 that results in a net clamping force directed inwardly toward the abutment plane that firmly and continuously holds the connected members together at surfaces 12' and 13'.

One preferred way of obtaining this interference fit is to form and dimension the connector and member slots so that the dihedral angle, a, formed between the sets of surfaces 74, 76 and 72, 78 or opposite members is slightly larger than the corresponding dihedral angle, b, defined between the adjacent surfaces of sets of legs 32', 36' and 30', 34', that seat against surfaces 74, 76 and 72, 78, respectively. As rigid connector 18' is inserted lengthwise into the slots, the smaller dihedral angle, b, defined between the connector's legs causes the legs to be wedged against surfaces 72, 76 and 74, 78 that form the larger dihedral angle, a. This results in the application of force components 79, and as above described, clamps the members together.

In this case, the legs of connector 18' are substantially rigid. However, the clamping action may be enhanced by making the connector out of a resilient material so that the sets of legs corresponding to legs 30', 34' and 32', 36' of connector 18' in FIG. 5 are forced apart, slightly, during the insertion of the connector by reason of the aforementioned interference fit with surfaces 72, 76 and 74, 78. Whereafter, the resiliency of the connector material urges the legs back toward their original unspread condition so as to continuously exert the above-described force components 79.

FIG. 6 illustrates the use of joints of the type shown in FIG. 1 through 5, to connect a set of three honeycomb-core panels 101, 102 and 103 to form a wall and window section of a modular building. Panel 101 is a wall panel section that is vertically elongate and is joined along its right-hand vertical edge surface to upper and lower header panels 102 and 103 and a stile 104 that forms the left-hand side of a casing for the window. The right-hand window casing is provided by another stile 106 that is aligned with the right-hand edges of header panels 102 and 103 to form a vertically continuous, slotted abutment surface to be connected to another juxtaposed panel section (not shown). The window frame members 108, 112, 110 and 114 are connected to the inwardly opposed surface edges of stiles 104 and 106 and to the lower edge surface of panel 102 and to the upper edge surface of panel 103, respectively.

The sequence of assembly may be as follows. First, member 108 of the window frame is connected to one slotted edge surface of stile 104 by a connector 116. Thereafter the other slotted edge surface of stile 104 and the end edge surfaces of header panels 102 and 103 are all joined together by a common connector 118 to the right-hand slotted edge of panel 101. Next the upper and lower window frame members 110 and 114 are installed by additional connectors (shown only by the hidden view lines). Finally the right-hand vertical frame member 112 is connected to one slotted edge surface of stile 106 by a connector 120 and member 112 and stile 106 are installed and connected to the upper and lower header panels 102 and 103 by a common connector 122.

FIG. 8 shows an alternative construction of the elongate connector for use in certain applications, such as where the ends of the V-shaped slots are obstructed and it is impractical or impossible to insert a longitudinally continuous connector of the above-described type. In the embodiment of FIG. 8, the connector is made up of a plurality of disjointed segments in the form of flat, rectangular chips 18a, 18b, 18c, 18d of hardwood, aluminum or other suitable material, arranged end to end and in an alternately criss-cross pattern to segmentally make-up the elongate and transversely cross-shaped configuration of the connector. Each chip, such as shown by chip 18d, may be inserted edgewise into one of the V-shaped slots 130 and 132 of a structural member 134. The other member 136 is initially separated from or in a longitudinally offset position with respect to member 134 (as illustrated in the drawing) so that the slots of member 134 are exposed for insertion of the chips. The width of each chip, i.e., the dimension transverse to the length of the slots, is selected to correspond to the transverse dimension of the transversely aligned legs of the integral connector 18 as shown in FIG. 1 so that one-half of the width of each chip resides in one slot of one member while the other half of the chip protrudes therefrom and is positioned to be received in that slot of the other structural member that is aligned with the chip. Alternate chips are thus received in alternate sets of transversely aligned slots each such set made up of one slot from one of the structural members and one slot from the other structural member.

The segmentation of the connector as shown in FIG. 8 enables members 134 and 136 to be connected even though an obstruction such as indicated at 138 (cut away for clarity) blocks the ends of the slots in members 134 and 136 end prevents the insertion of a longitudinally continuous connector. To form the connection, chips 18a, 18b, 18c, and 18d are successively inserted edgewise into slots 130 and 132 of member 134 and member 136 is disposed with its slotted abutment surface 140 in aligned, sliding contact with the corresponding abutment surface 142 of member 134. The V-shaped slots 144, 146 of member 136 are guided onto the protruding portions of chips 18a–d, and member 136 is slid relative to member 134 in the direction of arrow 144 to complete the joint.

FIG. 9 illustrates an embodiment of the invention in which the joint connecting the structural members is curved or otherwise deviates from a straight line. In particular, joints 150 and 152 are formed between abutting edge surfaces 153, 155 of arched roof panels 154, 156 and 158, 160 in which surfaces 153, 155 lie in a vertical plane and are bounded by the curves of the contoured edges of the panels. The V-shaped slots are saw cut along guide lines that are equidistant from the edges of the panel that delimit edge surfaces 153, 155 so that the slots follow the curves defined by such edges. Connectors 162 and 164 for these joints are fabricated to be bendable in a plane that includes their lengthwise dimension so that during endwise insertion into the slots, the connectors bend with and thus conform to the curvature.

In the building assembly of FIG. 9, roof panels 154, 156, 158 and 160 form arch-like roof segments in which each segment is supportively connected between a pair of elevated, spaced-apart, parallel beams, one of which is shown as beam 166, by joints, such as joints 168 and 170 of the type described above in regard to FIGS. 1 and 2. The end edge surfaces of each arch-shaped panel, such as surface 172 of panel 158, is abutted against a longitudinally extending pitched side surface 174 of an elongate abutment member 176 of upright triangular cross section in which the base portion of member 176 is affixed to and supported by an upper surface of beam 166. Surfaces 172 and 174 are formed with the aligned V-shaped slots for receiving the endwise insertion of a connector 178. Similarly the oppositely pitched side surface 180 of member 178 cooperates with an end surface 182 of panel 154 to accommodate joint 168. Between each pair of beams 166, a series of arch-shaped roof panels, such as panels 158 and 160 can be connected to span the spaced-apart beams at successive longitudinal locations therealong so as to form a segmented, arched roof that extends the entire length of the beams and in which adjacent pairs of arched panels are connected at the curved, abutting edge surfaces by joints such as joint 152.

In the foregoing embodiment, it is observed that the orientation of the connectors in the roof assembly form moisture traps along the joint by virtue of the pairs of upwardly projecting connector legs. Moisture that might otherwise seep downwardly through the joint is trapped in the trough formed by such legs and is channeled away. If desired the connectors can be adhesively bonded in place to form a watertight roof seal.

FIG. 10 illustrates an alternative construction of the curved joints of the above-described type in which the curvature of the connector is obtained by a longitudinally segmented connector made up of a plurality of criss-crossed end-to-end chips 164a, 164b, 164c, 164d, etc., like the segmented connector 18a–18d described above in connection with FIG. 8. The disjointed chips 164a–164d, each of which may be individually rigid (i.e., unbending), follow the curvature of the slots in a stepwise approximation thereof to provide an alternative to the longitudinally continuous but bendable connector 164 described above in connection with FIG. 9.

FIG. 11 depicts a pitched roof assembly including flat roof panels 190 and 192 having their opposed edge surfaces joined to a ridge beam 194 by connectors 196 and 198 of the type described above in connection with FIGS. 1 and 2. Panel 190 is supportively connected at a lower intermediate surface portion to the top of a wall 200 by a connector 202 of the same above-described type, and panel 192 although not fully shown in the drawing would be similarly supported by another wall. Ridge beam 194 is similar to a standard ridge beam used in modular building systems of this type and has a cross section in the form of an I-beam, compressed in height, and in which the opposed pairs of flanges 204, 206 and 208, 210 are bent at equal obtuse angles to the central vertical web 212. Flanges 204, 206 and 208, 210 define opposed channels angulated to match the pitch of the roof and into which edges of the opposed panels 190 and 192 are inserted. Beam 194 is modified in accordance with the present invention by the provision of elongate inserts 214 and 216 of wood or other suitable material as discussed with respect to inserts 26 in FIG. 1, and of rectangular cross section so that they can be disposed lengthwise with the beam, recessed within the respective pairs of flanges 204, 206 and 208, 210 and held in place by suitable means such as by screws, adhesive, etc. The outwardly facing surfaces 220 and 222 of inserts 214 and 216, respectively, are (prior to being mounted in beam 194) formed with V-shaped slots so that edgewise insertion of slotted edge surfaces 224 and 226 of panels 190 and 192, respectively, form the composite cross-shaped slots for receiving the elongate connectors that complete joints 196 and 198.

Joint 202 at the eave connection of panel 190 to wall 200 is formed by fabricating panel 190 with an elongate, wooden insert 230 provided at an intermediate location within the panel, extending parallel to edge surface 224. This may be done by cutting a longitudinally extending slot in the lower skin 232 of panel 190 and removing the underlying honeycomb core to form a hollow channel into which insert 230 is positioned and adhesively secured. The lower, exposed surface 234 of insert 230 coplanar with skin 232 is formed with the V-shaped slots and aligned with corresponding V-shaped slots on an abutting, transversely inclined surface 236 of an elongate member 238 affixed to the top of wall 200, and the elongate connector is inserted to complete joint 202.

Figure 12:
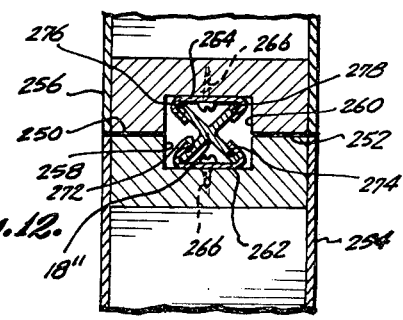
FIG. 12 is a transverse sectional view similar to FIG. 1 showing an alternative embodiment of the joint.

With reference to FIG. 12 a further alternative embodiment is illustrated, for use in applications where it is impractical to form the V-shaped slots of the foregoing embodiments. In lieu of the slots, the abutting edge surfaces 250 and 252 of structural members 254 and 256, respectively, are provided with channel-shaped recesses 258 and 260 that extend along the length of the edge surface equidistant from the edges of the members. Within recesses 258 and 260, channels 262 and 264 are disposed and secured by suitable means such as by screws 266 holding the web of each channel against the bottom surface of the recess. The flanges of each channel are disposed to project generally toward the opening of the recess and are biased toward the center of the channel and thus toward each other to define oppositely inclined, inner catch surfaces 272, 274 and 276, 278. These catch surfaces 272, 274 on channel 262 and surfaces 276 and 278 on channel 264 receive and coact with the legs of a connector 18″ in a manner similar to the cooperation of connector 18′ and slot surfaces 72, 74 and 76, 78 (FIG. 5) to exert an inwardly directed clamping force on the abutting members. Channels 262 and 264 may be made of a resilient material, such as mild steel, so that the flanges thereof maintain continuous pressure on the connector legs which in turn maintains the consistency of the above-mentioned clamping force.

While the invention has been disclosed by reference to presently preferred embodiments, this has been done for the purpose of teaching the principles of the invention and it will be apparent that changes and modifications can be made to the disclosed embodiments without departing from the spirit of the invention.

What is claimed is:

1. In combination, first and second structural members adapted to be joined and connected together along predetermined, longitudinally extending surface portions thereof, each said member having a pair of connector receiving slots that extend both longitudinally along the respective said surface and inwardly thereof to define in a transverse section therethrough a V-shape in which the apex of the V lies generally at said surface and the legs of the V diverge inwardly therefrom, said members when arranged with said surfaces abutting and with said V-shaped slots in mutually opposed registration defining a composite slot configuration that in transverse section is cross-shaped, an elongate connector means having a transverse section that is generally the compliment of said cross-shaped section of said composite slot configuration and that is insertable into said slots so that legs of said connector means transversely interlock with the slots of said members to thereby connect said members against relative displacement in the transverse plane; and said slots in said members having a longitudinal extent that is curved, and wherein said connector is deformable in a plane that includes its lengthwise dimension so that upon its insertion into said slots said connector conforms in its longitudinal extent to the curvature of said slots; and wherein said connector comprises a plurality of longitudinally disjointed segments, each segment being of substantially flat, rectangular shape, and said segments being arranged in an end-to-end, nonoverlapping, criss-crossed pattern that, in projection along the length of the joint, conforms to said cross-shape of said composite slot configuration and that, in said plane that includes said lengthwise dimension of said connector, conforms in a stepwise manner to the curvature of said slots.

2. In combination, first and second structural members adapted to be joined and connected together along predetermined, longitudinally extending surface portions thereof, each said member having a pair of connector receiving slots that extend both longitudinally along the respective said surface and inwardly thereof to define in a transverse section therethrough a V-shape in which the apex of the V lies generally at said surface and the legs of the V diverge inwardly therefrom, said members when arranged with said surfaces abutting and with said V-shaped slots in mutually opposed registration defining a composite of slots that in transverse section has a cross shaped configuration, an elongate connector insertable into said slots for connecting said members, said connector comprising:
a plurality of longitudinally disjointed segments, each segment being of substantially flat, rectangular shape, and said segments being arranged in said composite of slots in and end-to-end, non-overlapping, criss-crossed pattern that in longitudinal projection conforms to said cross-shaped configuration of said composite of slots, said segments interlocking with the slots of opposite said members so as to restrain said members against relative displacement in the transverse plane.

3. The combination in claim 2 wherein said criss-crossed pattern is defined by segments being alternately criss-crossed.

* * * * *